(12) United States Patent
Lin

(10) Patent No.: US 6,986,517 B2
(45) Date of Patent: Jan. 17, 2006

(54) COUPLING TUBE FOR A SCREWDRIVER HEAD

(76) Inventor: Peng-Ho Lin, No. 10, Lane 13, Fuh Ping Rd., Taiping (TW) 411

( * ) Notice: Subject to any disclaimer, the term of this patent is extended or adjusted under 35 U.S.C. 154(b) by 61 days.

(21) Appl. No.: 10/691,860

(22) Filed: Oct. 24, 2003

(65) Prior Publication Data

US 2005/0087938 A1     Apr. 28, 2005

(51) Int. Cl.
*B23B 31/107*     (2006.01)
(52) U.S. Cl. .......................................... 279/74; 279/82
(58) Field of Classification Search ................. 279/22, 279/29, 30, 74, 75, 82, 904, 906
See application file for complete search history.

(56) References Cited

U.S. PATENT DOCUMENTS

| | | | | |
|---|---|---|---|---|
| 3,652,099 A | * | 3/1972 | Bilz | 279/75 |
| 4,174,113 A | * | 11/1979 | Eckman | 279/19.4 |
| 4,768,405 A | * | 9/1988 | Nickipuck | 81/177.85 |
| 5,195,761 A | * | 3/1993 | Eimer | 279/90 |
| 5,934,384 A | * | 8/1999 | Wang | 173/132 |
| 6,176,654 B1 | * | 1/2001 | Jore | 408/239 R |
| 6,250,856 B1 | * | 6/2001 | Miyanaga | 408/57 |
| 6,302,408 B1 | * | 10/2001 | Zierpka | 279/75 |
| 6,666,114 B1 | * | 12/2003 | Lin | 81/438 |
| 2003/0230862 A1 | * | 12/2003 | Peters et al. | 279/82 |
| 2004/0026877 A1 | * | 2/2004 | Taylor et al. | 279/75 |
| 2004/0026878 A1 | * | 2/2004 | Chen et al. | 279/75 |
| 2004/0164503 A1 | * | 8/2004 | Fan-Chiang et al. | 279/75 |
| 2004/0188959 A1 | * | 9/2004 | Chen | 279/82 |

* cited by examiner

*Primary Examiner*—Boyer D. Ashley
*Assistant Examiner*—Michael W. Talbot
(74) *Attorney, Agent, or Firm*—Troxell Law Office, PLLC; Kuo-Hsiung Chiu

(57) ABSTRACT

The invention relates to a coupling tube for a screwdriver head having a main body, a socket, a spring element and two engaging rings. One end of the main body is formed with an engaging seat for fixing a screwdriver's head therein by use of an engaging element. The engaging element made of steel bar is bent in the shape of a semicircular ring. The main body has an external annular slot for receiving the engaging element. The middle part of the annular slot is opened for communicating with the engaging seat of the main body. Accordingly, the prearranged engaging face of the engaging element can project into the engaging seat for improving the stability when the screwdriver's head is inserted into the engaging seat.

2 Claims, 4 Drawing Sheets

COUPLING TUBE FOR A SCREWDRIVER HEAD

BACKGROUND OF THE INVENTION

1. Field of the Invention

The invention relates to a fixing structure for a screwdriver's head, and more particularly, to a coupling tube that is durable and allows a more stable fixing of the screwdriver's head.

2. Description of the Prior Art

The screwing tools have been used for quite some time. Their versions and structures are different according to the manufacturing factories and application surroundings. A conventional coupling tube 11, as illustrated in FIG. 5, for receiving screwdriver's heads employs a sleeve 12 mounted on the coupling tube 11. The sleeve 12 is extendable and retractable by use of a spring 13. An engaging element 14 is disposed between the sleeve 12 and the coupling tube 11. Meanwhile, the engaging element 14 projects into an engaging seat 15 into which a screwdriver's head 16 is inserted. Accordingly, an engagement or a disengagement of the screwdriver's head 16 is achieved by the extending and retracting movement of the engaging element 14 when the sleeve 12 telescopically moves. However, the engaging element 14 of the prior art is constructed as round steel pearl, and this will cause much inconvenience in manufacturing and engaging the screwdriver's head 16. The drawbacks of the prior art are concluded as follows:

1. Bad engaging effect: Referring again to FIG. 5, the protrusion of the engaging element 14 is engaged into a V-shaped indentation of the screwdriver's head 16. As the engaging element 14 is a steel pearl, a full engagement can't be reached, thereby reducing the stability in screwing. In addition, the steel pearl and the V-shaped indentation will be damaged by the wearing action after a longer using period, thereby lowering its stability again.
2. Difficult manufacturing: In order to allow the extending and retracting movement of the engaging element 14 with the telescopic movement of the sleeve, the part of the coupling tube 11 for receiving the engaging element 14 has to be bored with a conic round hole that corresponds to the V-shaped indentation for engaging the steel pearl into the V-shaped indentation. Accordingly, the manufacturing requires a relatively high precision, thereby increasing the manufacturing difficulty and cost.

SUMMARY OF THE INVENTION

It is a primary object of the invention to provide a coupling tube for a screwdriver head that can eliminate the above-mentioned drawbacks.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
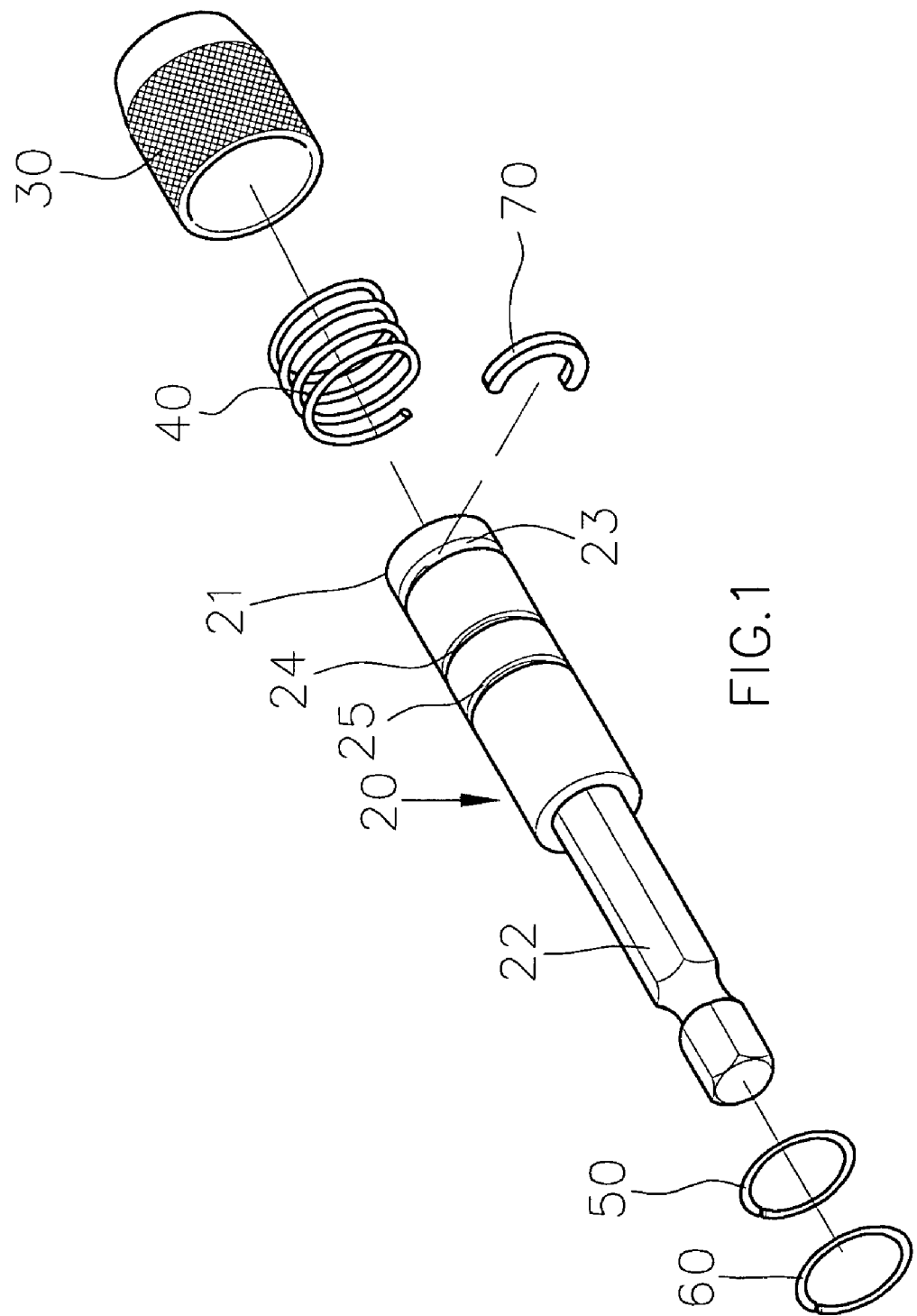
FIG. 1 is an exploded view of a preferred embodiment of the invention.
Figure 2:
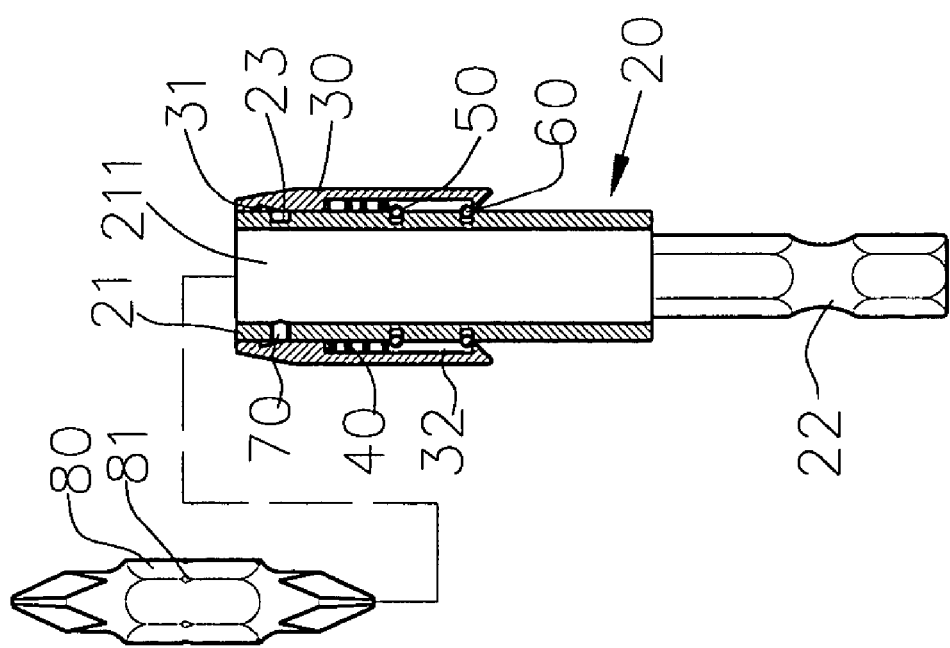
FIG. 2 is a sectional view of the preferred embodiment of FIG. 1 after assembly.

Referring to FIGS. 1 and 2, a preferred embodiment of the invention is shown. The coupling tube for a screwdriver head in accordance with the invention includes a main body 20, a socket 30, a spring element 40, two engaging rings 50, 60 and an engaging element 70. The main body 20 is formed in a cylindrical shape. One end thereof is formed with an engaging seat 21 for receiving a screwdriver's head 80 while the other end thereof is rigidly connected with an insertion rod 22. The engaging seat 21 includes an external annular slot 23 which communicates with an internal hole 211 of the engaging seat 21 such that the engaging element 70 can be placed right therein. A first engaging annular slot 24 is formed substantially in the middle of the main body 20 for receiving a first engaging ring 50. The socket 30 is mounted externally on the main body 20 and formed at the internal wall with a conic slot 31 that corresponds to the external annular slot 23. In addition, the socket 30 has an accommodation 32 with a larger internal diameter at one end of the socket 30 for receiving the spring element 40. A second engaging ring 60 corresponds to a second engaging annular slot 25 and rests upon the internal annular protrusion of the socket 30 for protecting the socket 30 from separating from the main body 20.

Figure 3:
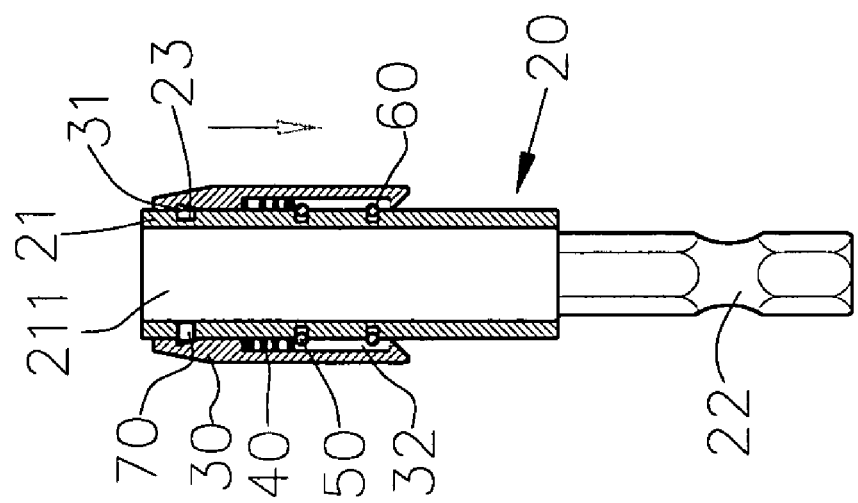
FIG. 3 is a sectional view of the preferred embodiment of FIG. 1 after assembly while the main body is extended.

As shown in FIG. 3, the coupling tube for a screwdriver head is characterized in that the engaging element 70 made of steel bar is bent in the shape of a semicircular ring. Meanwhile, the external annular slot 23 of the main body 20 corresponds to the engaging element 70, and its engaging face projects into the internal hole 211 of the engaging seat 21 for engaging the screwdriver's head 80. Accordingly, the engaging element 70 can be applied to the screwdriver's head 80 with a V-shaped indentation 81 for ensuring a more stable engagement than the conventional engaging elements. Besides, the structure in accordance with the invention makes the manufacturing procedure and the assembly easier, thereby achieving convenient, laborsaving and timesaving effects.

Figure 4:
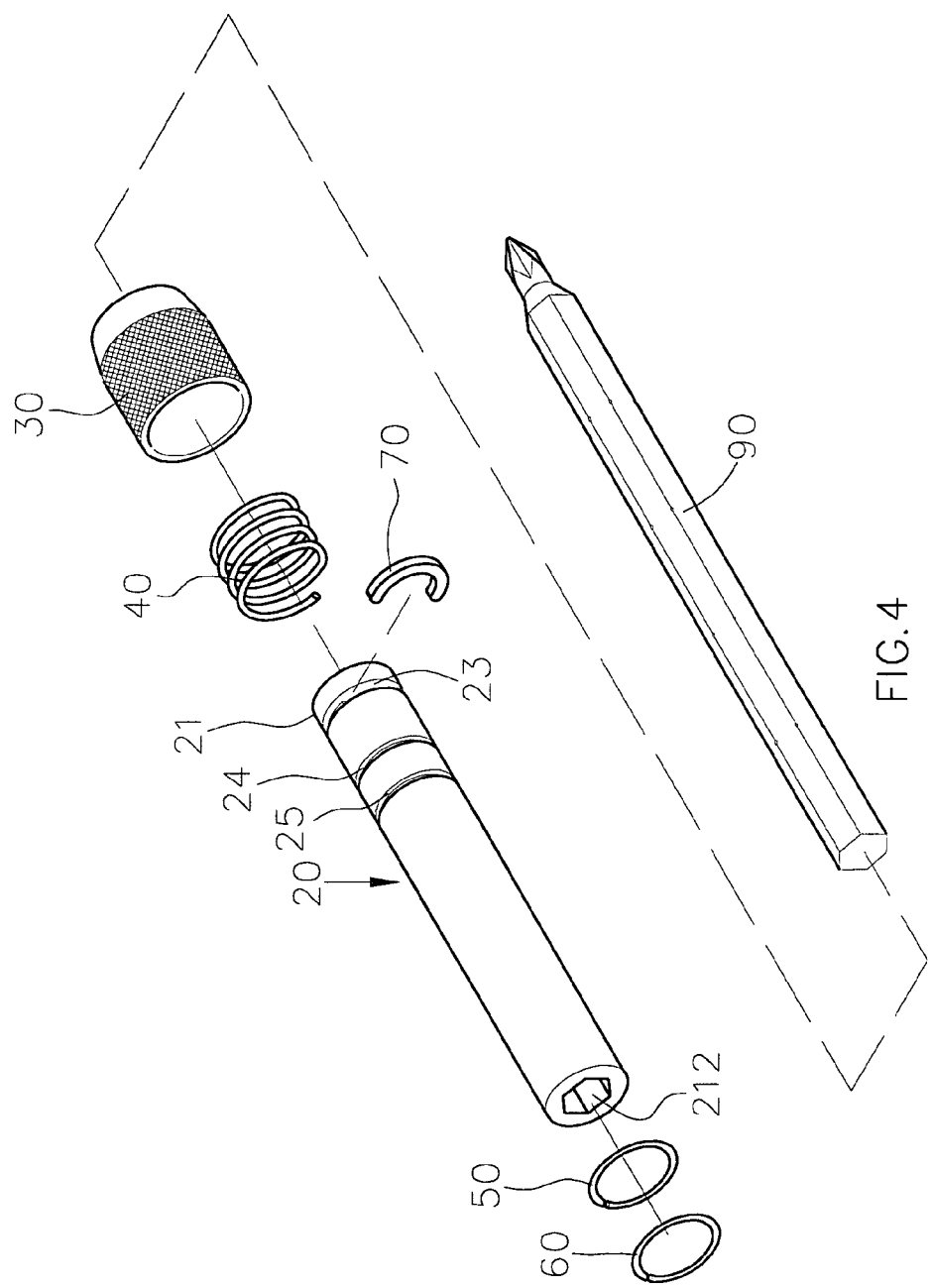
FIG. 4 is an exploded view of another embodiment of the invention.
Figure 5:
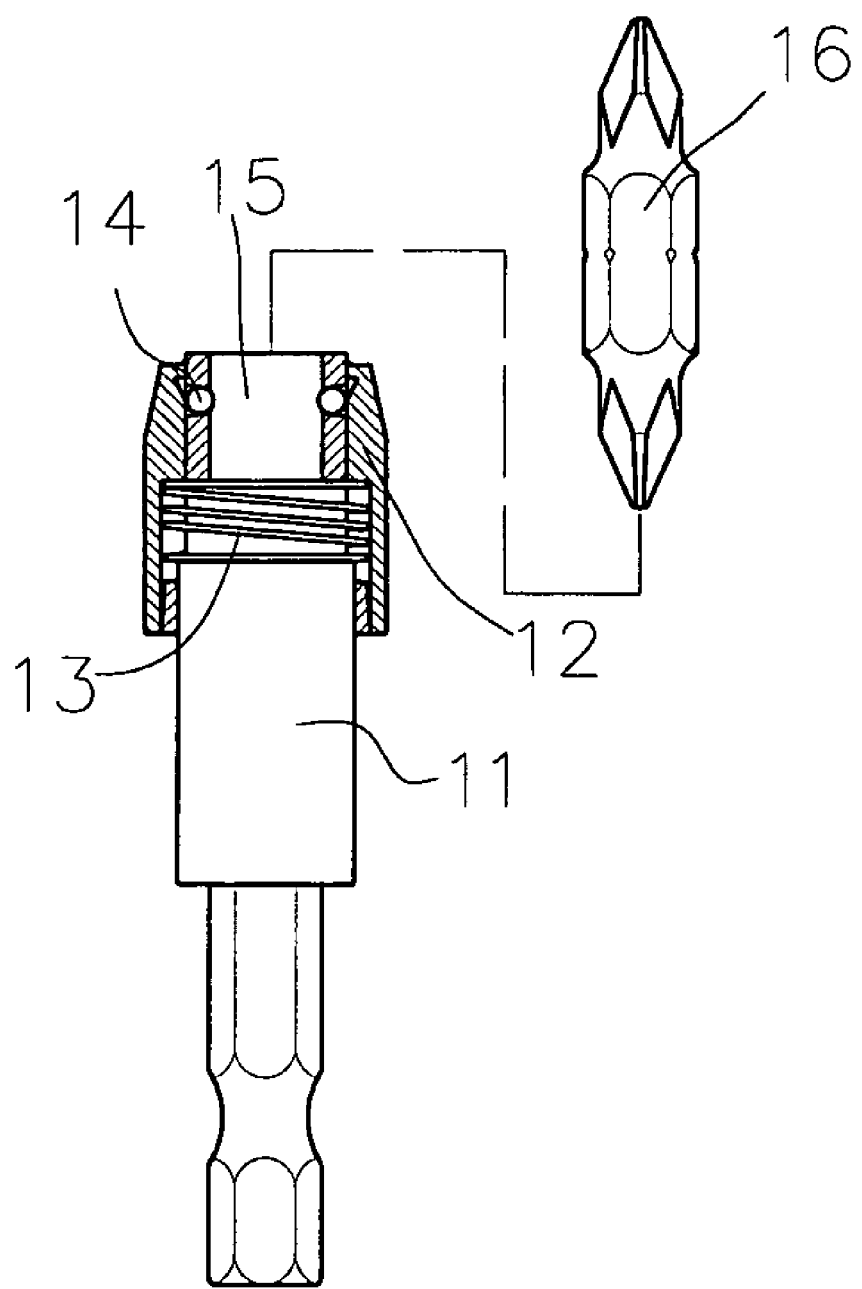
FIG. 5 is a sectional view of a prior art.

Referring now to FIG. 4, another embodiment of the invention is illustrated. The main body 20 is constructed as a tube with uniform external diameter. Moreover, the main body 20 has an internal through hole in polygonal shape for receiving a longer screwdriver's head 90 or a hexagonal tool.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A coupling tube for a screwdriver head comprising:
   a) a main body with a cylindrical shape and having:
      i) an engaging seat located on a first end thereof and having an internal hole and an external annular slot communicating with the internal hole, the screwdriver head is removably inserted into the internal hole;
      ii) an engaging element inserted into the external annular slot and being a semicircular ring having an engaging face protruding into the internal hole and selectively engaging a V-shaped indentation in the screwdriver head;
      iii) an insertion rod connected to a second end thereof;

iv) a first engaging annular slot located in a middle of the main body;

v) a first engaging ring inserted into the first engaging annular slot;

vi) a second engaging annular slot located between the first engaging annular slot and the insertion rod, the first engaging annular slot is located between the second engaging annular slot and the external annular slot; and vii) a second engaging ring inserted into the second engaging annular slot;

b) a socket inserted over the first end of the main body and having a conic slot located on an interior of a first socket end, a diameter of the interior of a second socket end is larger that a diameter of the first socket end forming an accommodation; and c) a spring element is located in the accommodation and engaging the first engaging ring, the first engaging ring is located between the spring element and the second engaging ring.

2. The coupling tube according to claim 1, wherein the main body is a hollow sleeve having a uniform external diameter and an internal through hole.

\* \* \* \* \*